United States Patent [19]
Rozmus

[11] Patent Number: 5,199,643
[45] Date of Patent: Apr. 6, 1993

[54] MODEL AIRCRAFT VARIABLE GEOMETRY NOZZLE

[76] Inventor: Walter J. Rozmus, 6113 Zion Cir., Port Orange, Fla. 32019

[21] Appl. No.: 867,471

[22] Filed: Apr. 13, 1992

[51] Int. Cl.⁵ .............................................. F02K 1/30
[52] U.S. Cl. ............................. 239/265.39; 244/53 R; 446/56
[58] Field of Search ................... 244/53 R, 73, 74; 239/265.39, 265.37, 265.17, 265.25, 265.33, 265.43, 546, 602; 446/56, 57

[56] References Cited

U.S. PATENT DOCUMENTS

| | | | |
|---|---|---|---|
| 2,545,586 | 3/1951 | Pollak | 446/56 |
| 2,634,578 | 4/1953 | Kallal | 239/265.39 |
| 2,693,078 | 11/1954 | Laucher | 239/265.39 |
| 2,865,165 | 12/1958 | Kress | 239/265.39 |
| 2,974,477 | 3/1961 | Egbert et al. | 239/265.39 |
| 4,196,856 | 4/1980 | James | 239/265.39 |
| 4,307,857 | 12/1981 | Godbersen | 446/56 |
| 4,502,636 | 3/1985 | Nightingale et al. | 239/265.39 |
| 4,850,535 | 7/1989 | Ivie | 239/265.39 |

*Primary Examiner*—Galen Barefoot
*Attorney, Agent, or Firm*—Ralph J. Skinkiss

[57] ABSTRACT

The present invention relates to a method and apparatus for providing an operable variable geometry exhaust nozzle for scale model jet aircraft. A multiplicity of hinged, overlapping, nozzle blades circumferentially surround the exhaust nozzle thereby providing a divergent cylindrical exhaust nozzle that may be convergingly reduced to a conical configuration by action of a remotely controlled solenoid.

20 Claims, 6 Drawing Sheets

MODEL AIRCRAFT VARIABLE GEOMETRY NOZZLE

BACKGROUND OF THE INVENTION

The present invention relates to scale model aircraft particularly, remotely controlled, flying scale models of jet propelled aircraft. In the scale model aircraft industry great efforts are taken to accurately reproduce the particular full scale operational aircraft both in appearance and operational characteristics. Although great strides have been achieved in the industry, one area affecting both appearance and scale model performance has been neglected; that being the jet exhaust nozzle. Operational jet aircraft of the present day are commonly equipped with engine exhaust nozzles having a variable area geometry; that is to say that the exit diameter of the jet exhaust nozzle may be varied depending upon the particular flight regime within which the aircraft is being operated.

Two particular flight regimes that require different exhaust nozzle configurations, for both full scale and model aircraft, are take-off and in flight cruse. Full scale operational aircraft employ maximum exhaust nozzle diameters for take-off and decrease or restrict the exhaust nozzle diameter during in flight cruse. It is an established fact that jet propelled aircraft, full scale or model aircraft, cannot have a cruising velocity, or air speed, greater than the exit velocity of the jet engine exhaust at the tail pipe exhaust nozzle. It is also established that the optimum exhaust nozzle configuration to produce maximum thrust at take-off (requiring a large diameter nozzle opening) is not optimum at cruse where less than take-off thrust is required to propel the aircraft at a constant velocity or air speed. Therefore, full scale operational aircraft are equipped with variable area exhaust nozzles whereby the diameter of the nozzle may be decreased or restricted to a smaller, more optimum, diameter for in flight cruse.

Scale model jet aircraft using ducted fan technology to obtain a propelling thrust from the exhaust nozzle, experience similar nozzle configuration problems as their full scale counterparts; that being that a large diameter exhaust nozzle configuration is desired for take-off however, a smaller or reduced diameter exhaust nozzle diameter is desired for in flight cruse.

Heretofore, scale model jet aircraft, employing a ducted fan propulsion system, have used an "optimum" fixed, non variable, nozzle configuration that although providing nominal performance in both the take-off and in flight cruse regimes, does not provide for maximum performance in either operational regime.

SUMMARY OF THE PRESENT INVENTION

The present invention provides method and apparatus for varying the exhaust nozzle configuration of scale model jet propelled aircraft employing ducted fan technology to provide the jet thrust required. A plurality of overlapping exhaust nozzle blades are circumferentially and hingedly attached to a tail pipe attachment ring such that the exit diameter of the nozzle may be full open for the take-off regime and convergingly restricted in flight to a smaller diameter thereby producing an increase in exhaust gas velocity resulting in an increase in cruse air speed.

DETAILED DESCRIPTION OF THE PREFERRED EMBODIMENT

Figure 1:
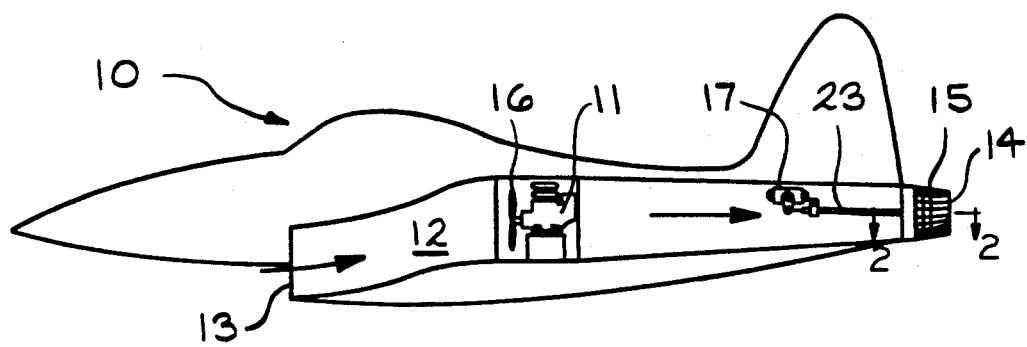
FIG. 1 presents a sectional view of a typical jet propelled aircraft model embodying my variable geometry thrust nozzle.

FIG. 1 shows a typical ducted fan propulsion system as commonly used in a scale model jet aircraft 10 to provide the required operational thrust. Typically a gasoline engine 11 is positioned within duct 12 having an inlet 13, a tail pipe 17 and an exhaust exit 14. The engine 11 typically drives a multi-blade propeller 16, or other type of fan assembly, which generally draws mass air flow into the inlet 13, at a pressure lower than atmospheric, past the propeller and over the engine 11, thereby providing combustion and cooling air to the engine. Energy is imparted to the air mass by the propeller and is thus accelerated, at a pressure higher than atmospheric through tail pipe 17, toward the exhaust exit 14 exiting therefrom as thrust which propels the model aircraft forward.

Figure 2A:
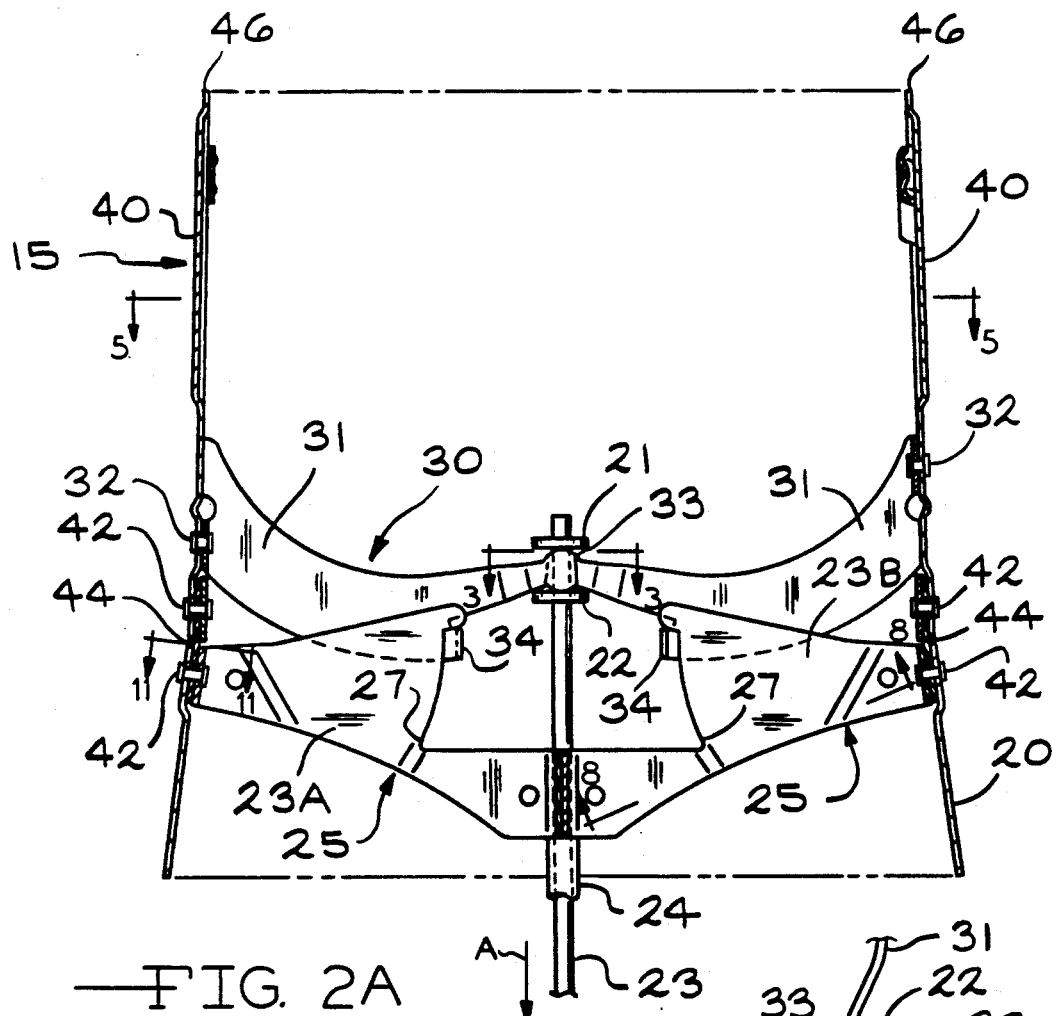
FIG. 2A presents a sectional view of my variable geometry thrust nozzle as taken along line 2—2 of FIG. 1 showing the nozzle in the full open cylindrical configuration.
Figure 3:
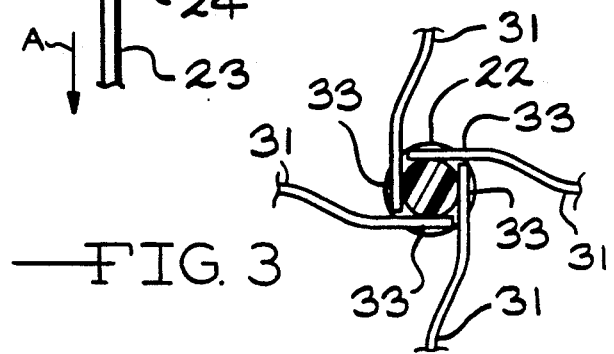
FIG. 3 is a sectional view taken along line 3—3 of FIG. 2A.
Figure 2B:
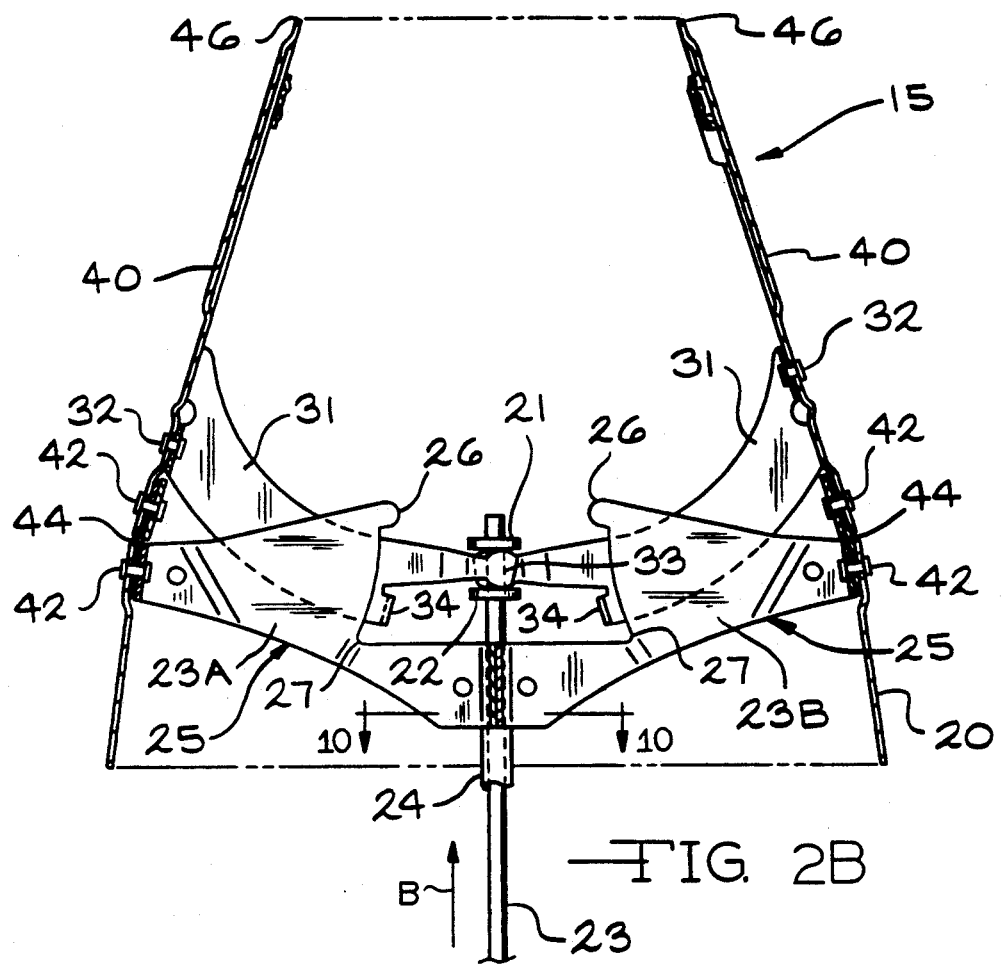
FIG. 2B presents a sectional view of my variable geometry thrust nozzle as taken along line 2—2 of FIG. 1 showing the nozzle in the restricted or converged conical geometry.

A variable geometry exhaust nozzle 15 is provided at exit 14 of tail pipe 17. Nozzle 15 may be selectively positioned in the full divergent open position as shown in FIG. 2A, or in a convergent restricted mode, as shown in FIG. 2B, thereby reducing the diameter of the exit nozzle and increasing the exit velocity of the accelerated air mass as it exits the aircraft 10.

Figure 4:
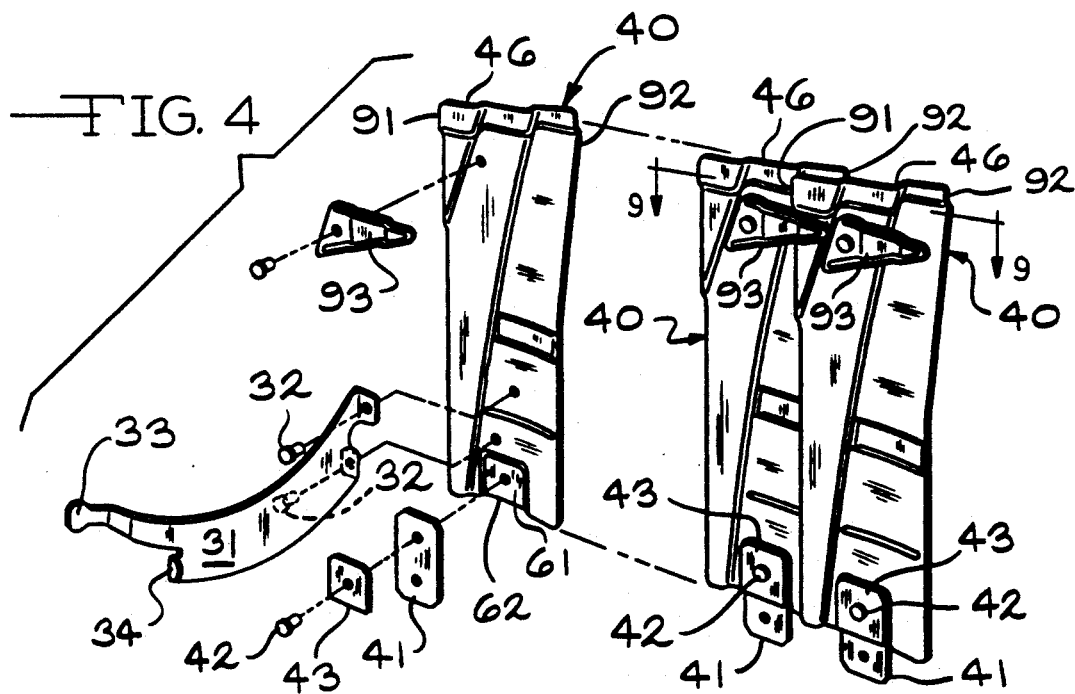
FIG. 4 shows a fragmentary exploded pictorial view of the preferred structure of my variable geometry nozzle.
Figure 5:
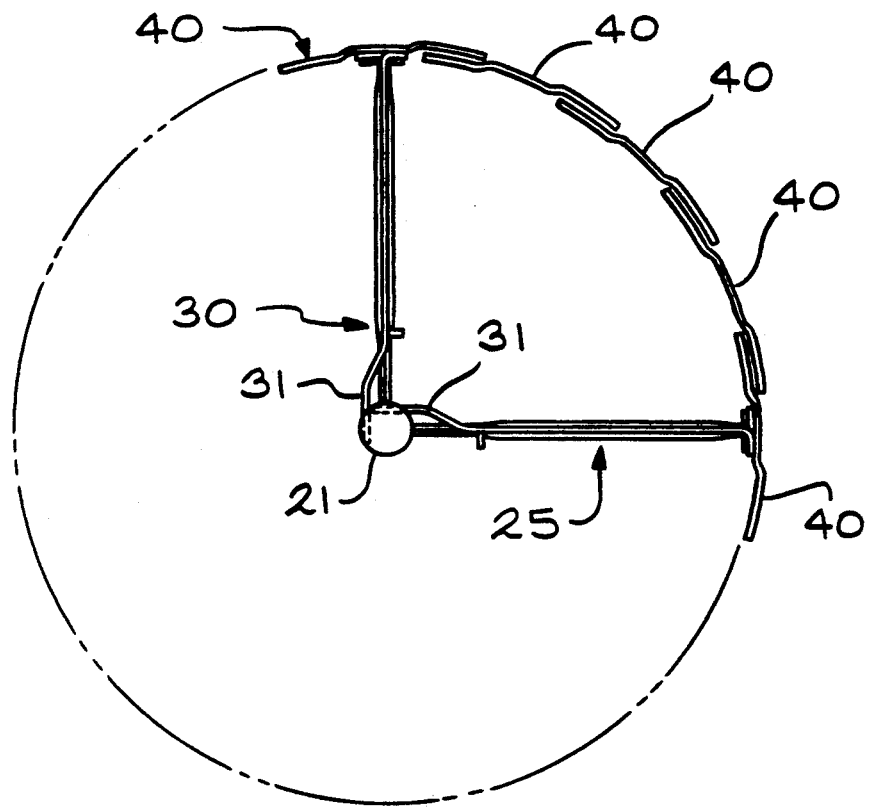
FIG. 5 is a sectional view taken along line 5—5 of FIG. 2A.
Figures 6, 7, 8:
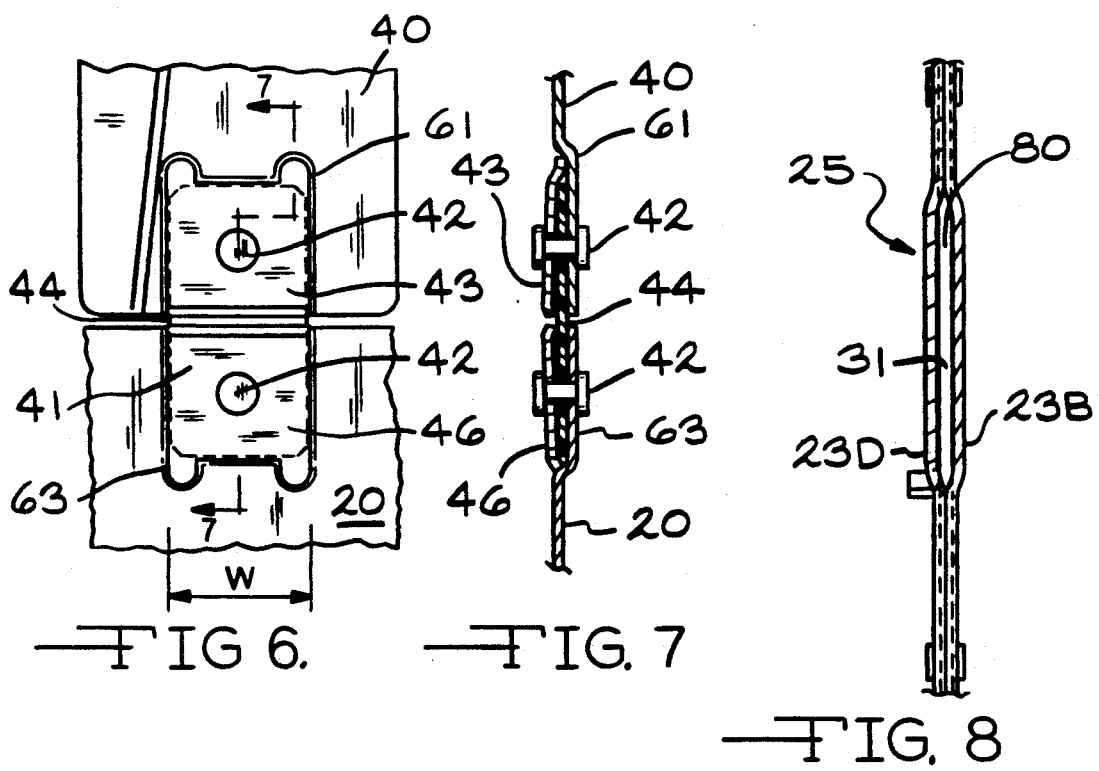
FIG. 6 is a fragmentary elevational view of the preferred hinge employed to fasten the variable position blades to the nozzle ring.
FIG. 7 is a sectional view taken along line 7—7 of FIG. 6.
FIG. 8 is a sectional view taken along line 8—8 of FIG. 2A.

Referring to FIGS. 1 through 6, nozzle 15 comprises a plurality of blades 40 slidingly and overlappingly interconnected with one another as shown in FIGS. 4 and 5. Each blade 40 is hingedly connected to a nozzle attachment ring 20 by flexible strap type hinges 41 rigidly affixed to blade 40 and the nozzle attachment ring 20 by any suitable means such as rivets 42. Embossed within each blade is a hinge receiving recess 61 receiving therein hinge 41. Width W of hinge recess 61 is such that hinge 41 tightly fits therein, thereby preventing rotational movement of hinge straps 41 about rivet 42. Similar hinge receiving recesses 63 are also provided on attachment ring 20. As shown in FIGS. 4, 6 and 7, it is preferred to interpose hinges 41 between the hinge recesses 61 and/or 63 and rivet plates 43 and 46 respectively, thereby assuring that the hinge line 44 remains a straight line parallelling the free edge 62 of the hinge recess 61. Typically suitable hinge material is that which is commonly used in the model aircraft industry for hingedly connecting flight control surfaces such as elevators and/or rudders to the horizontal and vertical stabilizer respectively.

Figure 9A:
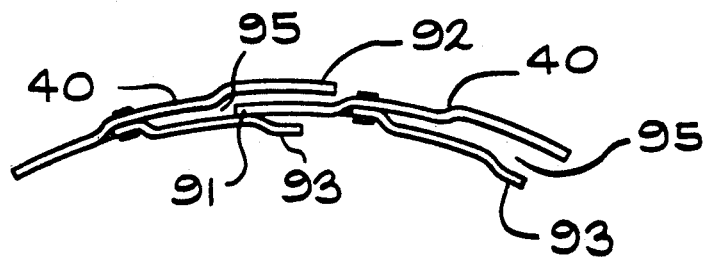
FIG. 9A is a sectional view taken along line 9—9 of FIG. 4 showing the nozzle in the full open configuration.
Figure 9B:
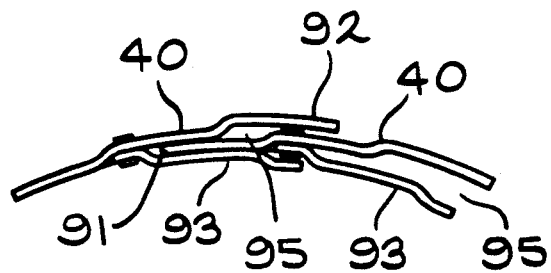
FIG. 9B is a sectional view taken along line 9—9 of FIG. 4 showing the nozzle in the restricted configuration.

As seen in FIGS. 4, 9A and 9B, the blades 40 overlappingly interconnect with one another to form the variable geometry divergent/convergent nozzle 15. FIG. 9A shows the overlapping of blades 40 when the nozzle 15 is in the full open or cylindrical configuration and FIG. 9B shows the overlapping configuration of adjacent blades 40 when nozzle 15 is in the restricted or conical configuration.

When in the full open divergent configuration, as shown in figure 9A and FIG. 4, the leading edge 91 of blade 40 overlaps the trailing edge 92 of the adjacent blade 40, as shown, and is slidingly retained between the adjacent blade 40 and its associated clip 93. As nozzle 15 is convergingly closed or restricted by action of rocker arm 31, as described below, each blade 40 is caused to further overlap the adjacent blade 40, as shown in figure 9B, by the leading edge 91 circumferentially advancing further into the gap 95 between the adjacent blade 40 and its associated clip 93, as shown in FIG. 9B, thereby convergingly reducing the nozzles exit diameter.

A nozzle actuator mechanism 30 functions to drive the variable exhaust nozzle 15 from the full open divergent position, as shown in FIG. 2A, to the convergingly restricted position as shown in FIG. 2B. Nozzle actuator 30 preferably comprises four equally spaced rocker arms 31 as shown in FIG. 5. Each rocker arm 31 is rigidly attached to an associated exhaust nozzle blade 40 by any suitable attachment means such as rivets 32 as shown in FIG. 4. At the opposite end of rocker arm 31 is an axially offset pivot tab 33 received between washers 21 and 22. Washers 21 and 22 are rigidly attached to push rod 23 and axially spaced to rotatingly receive the pivot tabs 33 of rocker arms 31 therebetween.

Figure 10:
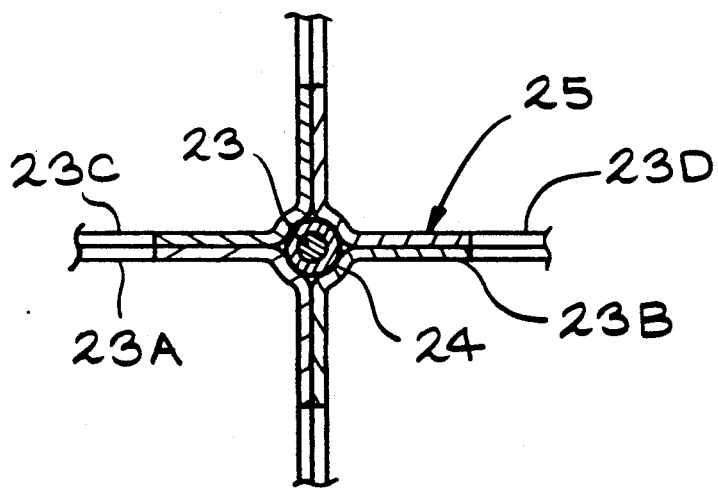
FIG. 10 is a sectional view taken along line 10—10 of FIG. 2B.
Figure 11:
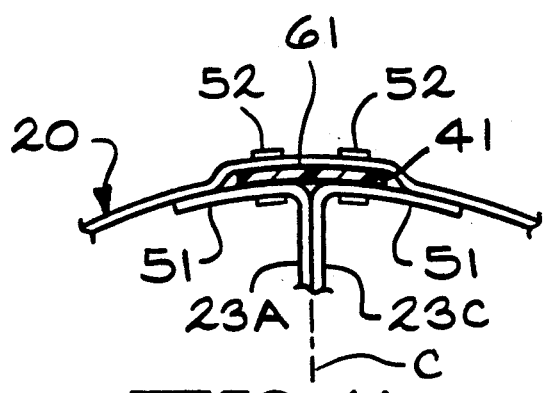
FIG. 11 is a sectional view taken along line 11—11 of FIG. 2A.

Referring to FIGS. 2A, 2B, 8 and 10, rocker arms 31 are slidingly received within associated guide slots 80 of rocker arm guide assembly 25. Rocker arm guide assembly 25 is preferably constructed of four guide plates 23A, 23B, 23C, and 23D each configured to form ninety degree right angled subassemblies circumscribing and fictionally engaging, therebetween, push rod guide tube 24 as shown in FIG. 10. The fabricated rocker arm guide assembly 25 is rigidly attached to the nozzle attachment ring 20 at four equally spaced positions and symmetrically about a hinge 41 centerline C as shown in FIG. 11. The mounting tabs 51 of guide plates 23 are riveted through hinge 41 and to the nozzle attachment ring thereby replacing the rivet plate 43 otherwise placed over the hinge 41.

To operate the variable exhaust nozzle the solenoid 17 (FIG. 1) is activated thereby causing push rod 23, FIG. 2A, to move in the direction of arrow A. All four rocker arms 31 then rotate radially inward, about hinge line 44 to the position illustrated in figure 2B thereby causing the nozzle blades 40 to likewise rotate radially inward about hinge line 44. Since one end of the blades 40 are hingedly affixed to the attachment ring 20 and equally spaced thereabout, the free ends 46, of the blades 40, must converge to form a smaller diameter opening, as shown in FIG. 2B, by each blade overlapping one another as described above. To open the variable nozzle to its full open or divergent configuration, the solenoid is activated in reverse and the push rod moves in the direction of arrow B, in FIG. 2B, thereby reversing the process and divergingly open nozzle 15 to a wider diameter.

To limit the maximum and minimum opening diameter of my variable exhaust nozzle each rocker arm 31 is provided a tang 34 that abuts against the maximum and/or minimum stop 26 and 27 when the nozzle is in the full open and fully restricted positions respectively; see FIGS. 2A and 2B.

Figure 12:
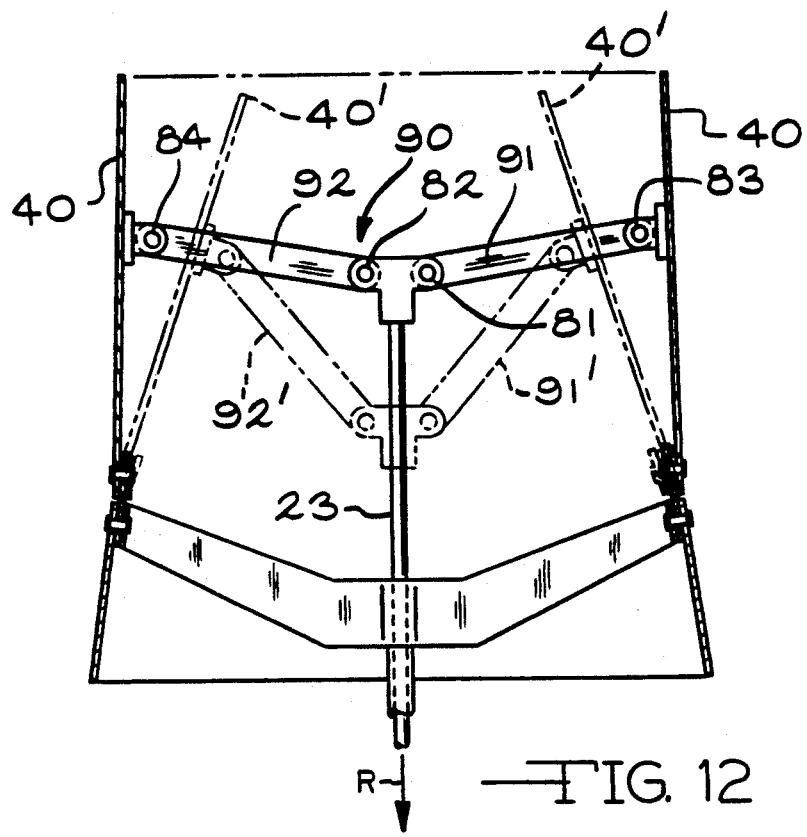
FIG. 12 is a sectional view, similar to FIGS. 2A and 2B, showing an alternate embodiment of the nozzle actuating mechanism.

FIG. 12 shows an alternative nozzle activation mechanism 90 embodying a well known toggle linkage and shown in the full open divergent nozzle configuration. As push rod 23 is retracted in the direction of arrow R, links 91 and 92 pivot about pivots 81, 82, 83 and 84, and translate to the secondary positions 91, and 92,' as shown by broken lines, thereby causing the nozzle blades 40 to rotate convergingly inward, as described above, thereby assuming the restricted convergent nozzle configuration 40'.

Figure 13:
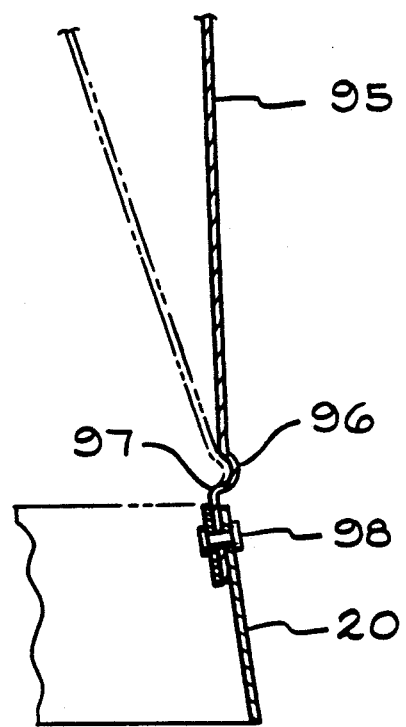
FIG. 13 is sectional view, similar to FIG. 7, showing an alternate technique for hingedly connecting the variable positioned flaps to the nozzle ring.

FIG. 13 illustrates an alternate technique for hingedly connecting nozzle blades 95 to the nozzle attachment ring 20. Each blade 95 may be provided a spring like semicircular bend 96, at the hinge line 97, to absorb or otherwise relieve the bending stresses that will otherwise cause fatigue failure of the blade metal at the hinge line. It is preferable to attach blade 95 to the nozzle attachment ring 20 using two, circumferentially spaced, rivets 98 thereby preventing any pivotal rotation of blade 95 about rivets 98.

Figure 14:
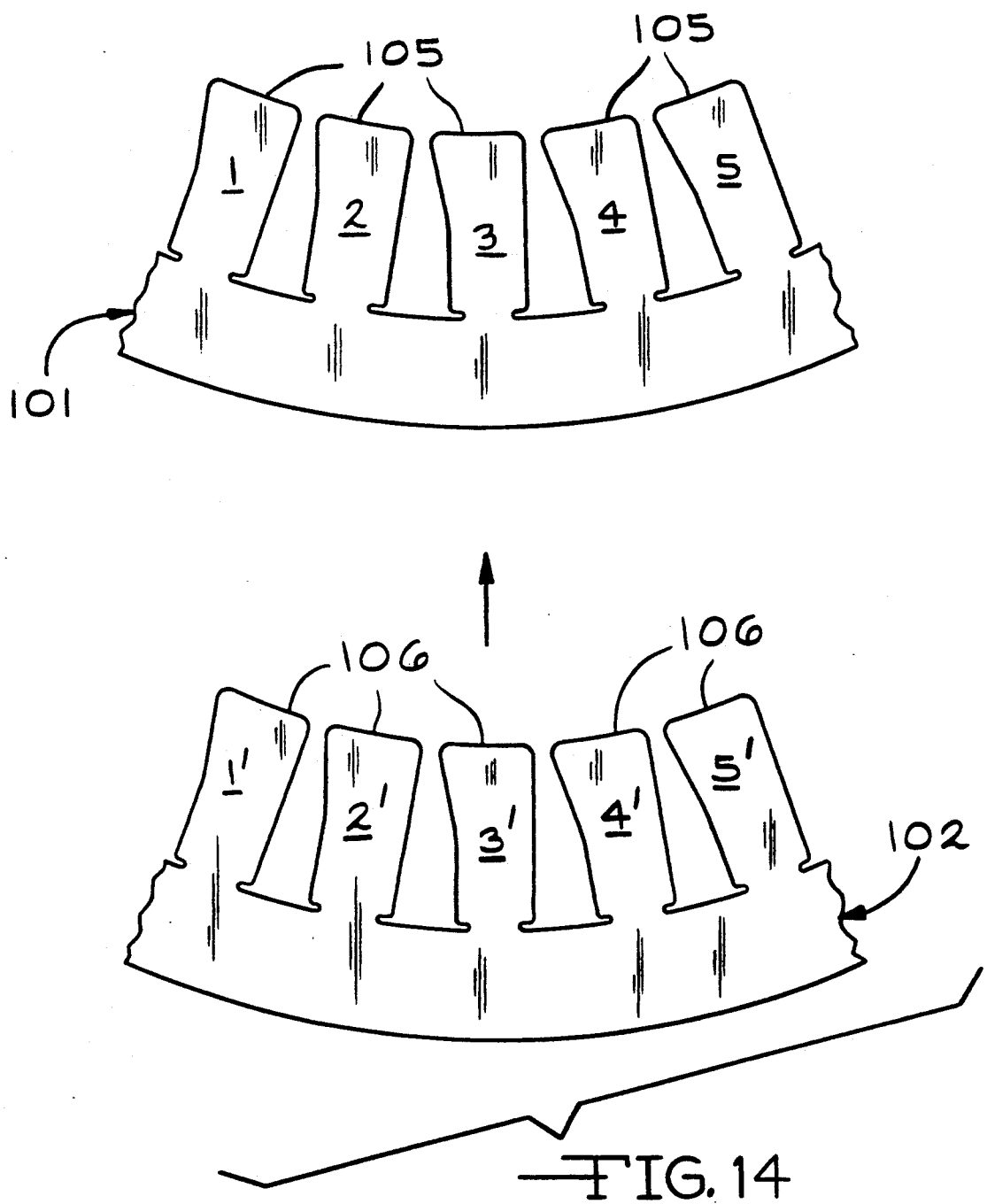
FIG. 14 is a schematic view generally showing an alternate method for manufacturing a variable geometry nozzle embodying my invention.

FIG. 14 schematically shows an alternate technique for forming a variable exhaust nozzle without requiring individual attachment of the nozzle blades to a common attachment ring. Two bands 101 and 102, having the requisite number of integral blades 105 and 106 numbered 1 through 5 and 1' through 5' in FIG. 14, may be punched or otherwise cut from a sheet of thin flexible metal or other suitable plastic material as generally shown. Bands 101 and 102 may then be placed one on top of the other such that blade 1' of band 102 is interposed between blades 1 and 2 of band 101 such that blade 1' overlaps blade 1 of band 101 and underlaps blade 2 of band 101. Similarly blade 2' of band 102 may be interposed between blades 2 and 3 of band 101. Thus by interposing the alternating blades of bands 101 and 102, a composite nozzle may be formed having the requisite circumferentially spaced overlapping blades integral with the nozzle attachment ring. In the embodiment of FIG. 14 it would be preferred to use the blade hinge technique as shown and described in FIG. 13.

Although the invention has been described in detail with reference to the illustrated preferred embodiment, variations and modifications exist within the scope and spirit of the invention as described and as defined in the following claims.

I claim:

1. In a scale model jet propelled aircraft receiving its forward propelling thrust from the exit of high velocity gases from a rearwardly directed tail pipe, the improvement comprising a variable area exhaust nozzle affixed to the exit end of said tail pipe, said nozzle having a multiplicity of overlapping blades circumferentially spaced about the exit end of said tail pipe, each of said blades hingedly connected to the perimeter of said tail pipe opening, operable means positioned inside of said nozzle for convergingly rotating said blades inwardly toward and divergingly outward from the tail pipe counterline about said hinged connection thereby selectively varying the nozzle exit area.

2. The improvement as claimed in claim 1 wherein said operable means comprises mechanical actuation means affixed to the inside surface of selected nozzle blades.

3. The improvement as claimed in claim 2 wherein said mechanical actuation means may be selectively activated by remotely controlled means.

4. The improvement as claimed in claim 3 wherein said remotely controlled means comprises a radio controlled solenoid.

5. The improvement as claimed in claim 2 wherein said mechanical actuation means includes two or more rocker arm lever means, each having one end thereof attached to the inside surface of an associated nozzle blade and the other end thereof affixed to an axially translating push-pull means whereby axial movement of said push-pull means affects selective angular movement of said rocker arm levers inwardly toward or outwardly from said nozzle centerline causing converging and diverging movement to said nozzle blades, thereby decreasing or increasing the exit area of said nozzle respectively.

6. The improvement as claimed in claim 5 wherein said mechanical actuation means further includes guide means associated with each rocker arm leaver means for axially guiding said rocker arm means during axial movement of said push-pull means.

7. The improvement as claimed in claim 2 wherein said mechanical actuation means includes at least two mechanical linkage assemblies for activating said variable area nozzle, each assembly comprising a first pivot means affixed to the inside surface of an associated blade, link means pivotly connected, at one end thereof, to said first pivot means, second pivot means connecting said other end of said link means to an axially translating push-pull means whereby axial movement of said push-pull means affects selective angular movement of said linkage assemblies inwardly toward or outwardly from said nozzle centerline causing converging and diverging movement of said nozzle blades thereby decreasing or increasing the exit area of said nozzle respectively.

8. The improvement as claimed in claim 2 wherein said blades are hingedly affixed to a nozzle attachment ring, said attachment ring affixed to and circumscribing said tailpipe opening, said attachment ring having a multiplicity of first recessed areas one area for each of said blades, each of said blades having a corresponding second recessed area, a flexible hinge positioned within each of said first recessed areas and longitudinally extending into each of said second recessed areas, separate plate means positioned atop said hinge and over said first and said second recessed areas thereby restraining said hinge between said plate means and said recessed area, fastener means extending through each of said plate means, said hinge and the associated recessed area thereby affixing each of said hinges to said ring and an associated blade forming a hinge line generally paralleling the periphery of said ring whereby said blades may convergingly rotate inward toward the tailpipe center line and divergingly rotate outward from said centerline.

9. The improvement as claimed in claim 2 wherein each of said blades includes hinge means comprising a generally semicircular bend adjacent the hinge end of said blade, the axis of said semicircular bend generally paralleling the hinge end of the blade and terminating in a longitudinal extension of the blade, said blade extension being affixed to said tailpipe opening such that as the blade may convergingly and divergingly rotate toward and away from said tailpipe centerline, whereby the bending stresses are absorbed by said semicircular bend.

10. The improvement as claimed in claim 2 wherein each of said blades includes a generally longitudinal leading edge and a generally longitudinal trailing edge, an offset clip means circumferentially extending the trailing edge of the blade and affixed to said blade thereby providing a circumferentially extend gap between said blade and said clip means for slidingly receiving therein the leading edge of the next adjacent blade.

11. The improvement as claimed in claim 6 wherein said guide means includes two juxtaposed plates extending radially inward from said tailpipe and having a gap therebetween for slidingly receiving said rocker arm lever means therein.

12. The improvement as claimed in claim 8 wherein said hinge comprises a hinge strap.

13. In a jet propelled scale model aircraft receiving its forward propelling thrust from the exit of high velocity gases from a rearwardly directed tail pipe, the improvement comprising a variable area exhaust nozzle affixed to the exit end of said tail pipe, said nozzle comprising at least a first and second cylindrical band circumscribing said tailpipe, said second band circumscribing said first band, each of said bands having a multiplicity of rearwardly extending nozzle blades, said blades circumferentially spaced about an extended centerline of said tailpipe, each of said blades having a longitudinally extending and circumferentially spaced leading and trailing edge, the blades of said first band and said second band alternatingly and circumferentially overlapping each other whereby the leading edge of one blade, on said first band, overlaps the trailing edge of the next adjacent blade on said second band, operable means positioned inside of said nozzle for convergingly and divergingly rotating said blades inward toward and outward from the tailpipe centerline.

14. The improvement as claimed in claim 13 wherein said operable means comprises mechanical actuation means affixed to the inside surface of selected nozzle blades to convergingly decrease and divergingly increase the exit diameter of said exhaust nozzle.

15. The improvement as claimed in claim 14 including remotely controlled means whereby wherein said mechanical actuation means may be selectively activated by remotely controlled radio means.

16. The improvement as claimed in claim 14 wherein said mechanical actuation means includes two or more rocker arm lever means, each having one end thereof attached to the inside surface of an associated nozzle blade and the other end thereof affixed to an axially translating push-pull means whereby axial movement of said push-pull means affects selective angular movement of said rocker arm levers inwardly toward or outwardly from said nozzle centerline causing converging and diverging movement of said nozzle blades thereby decreasing or increasing the exit area of said nozzle respectively.

17. The improvement as claimed in claim 16 wherein said mechanical actuation means further includes guide means associated with each rocker arm leaver means for axially guiding said rocker arm means during axial movement of said push-pull means.

18. The improvement as claimed in claim 14 wherein said mechanical actuation means includes at least two mechanical linkage assemblies for activating said variable area nozzle, each assembly comprising a first pivot means affixed to the inside surface of an associated blade, line mean pivotly connected, at one end thereof, to said first pivot means, second pivot means connecting said other end of said link means to an axially translating push-pull means whereby axial movement of said push-pull means affects selective angular movement of said linkage assemblies inwardly toward or outwardly from said nozzle centerline causing converging and diverging movement of said nozzle blades thereby decreasing or increasing the exit area of said nozzle respectively.

19. The improvement as claimed in claim 17 wherein said guide means includes tow juxtaposed plates extending radially inward from said tailpipe and having a gap therebetween for slidingly receiving said rocker arm lever means therein.

20. The improvement as claimed in claim 13 wherein each of said blades includes a generally longitudinal leading edge and a generally longitudinal trailing edge, an offset clip means circumferentially extending toward the trailing edge of the blade and affixed to said blade thereby providing a circumferentially extending gap between said blade and said clip means for slidingly receiving therein the leading edge of the next adjacent blade.

* * * * *